G. A. MERKT

RECIRCULATING SYSTEM AND APPARATUS FOR WASTE FURNACE GASES

April 25, 1933. Re. 18,801

Original Filed Sept. 16, 1929 3 Sheets-Sheet 1

Inventor:
Gustav A. Merkt.
By. Geo. H. Kennedy Jr.
Attorney.

G. A. MERKT

RECIRCULATING SYSTEM AND APPARATUS FOR WASTE FURNACE GASES

April 25, 1933. Re. 18,801

Original Filed Sept. 16, 1929 3 Sheets-Sheet 2

Inventor.
Gustav A. Merkt.
By. Geo. H. Kennedy Jr.
Attorney.

G. A. MERKT

RECIRCULATING SYSTEM AND APPARATUS FOR WASTE FURNACE GASES

April 25, 1933. Re. 18,801

Original Filed Sept. 16, 1929 3 Sheets-Sheet 3

Inventor
Gustav A. Merkt
By Geo. A. Kennedy Jr.
Attorney.

Reissued Apr. 25, 1933

Re. 18,801

UNITED STATES PATENT OFFICE

GUSTAV A. MERKT, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS

RECIRCULATING SYSTEM AND APPARATUS FOR WASTE FURNACE GASES

Original No. 1,814,567, dated July 14, 1931, Serial No. 393,100, filed September 16, 1929. Application for reissue filed February 13, 1933. Serial No. 656,559.

The present invention relates to a system and apparatus for recirculating the waste gases of heating furnaces, and more particularly regenerative or open hearth furnaces.

As is well known to those familiar with the operation of heating furnaces, it is sometimes necessary to limit or reduce the furnace temperatures effective on the articles or materials to be heated,—as for instance, where the flame temperature produced by combustion of the fuel employed in the furnace is higher than can be safely endured by the surfaces of the articles or materials to be heated. Such a condition is not infrequently encountered in the operation of various metallurgical furnaces such as open hearth furnaces or soaking pits, or annealing, galvanizing, or tinning furnaces, where the latter are fired with rich fuels, such as coke oven gas, natural gas, fuel oils, powdered coal, and the like, whose excessive flame temperatures, in the absence of steps taken to reduce them, are apt to be destructive to the contents of furnaces of these types.

Various expedients are available to effect a reduction of the temperature of the products of combustion, under these circumstances. It is possible, and sometimes customary, to dissipate a part of the heat carried by the combustion products to any suitable cooling medium such as the surrounding atmosphere, and it is also possible, and sometimes customary, to dilute the combustion gases with an excess of fresh air. A more practical and economical expedient is to dilute the combustion gases with a portion of the partly cooled waste gases of combustion which, having given up much of their heat to the contents of the furnace, are about to be discharged therefrom. It is with such a system for the recirculation of these waste gases that the present invention is concerned.

Heretofore, the recirculation of waste furnace gases, for the purposes above set forth, has been effected in a more or less haphazard fashion, and an object of the present invention is to provide a definite control of this recirculation. Another object of the invention is to increase the thermal efficiency of a furnace so equipped for recirculation of waste gases by pre-heating said gases, together with the air employed to support combustion, in regenerators or recuperators, which are made a part of the recirculating system. In this way, the heating or combustion chamber of the furnace is supplied with a heated mixture of air and waste gases, and a further object of the invention is to provide for a definite regulation of the respective amounts of air and waste gases, in the composition of this mixture. Other and further objects and advantages of the invention will be apparent from the following detailed description thereof, reference being had in this connection to the accompanying drawings in which—

Like reference characters refer to like parts in the different figures.

Figure 1:
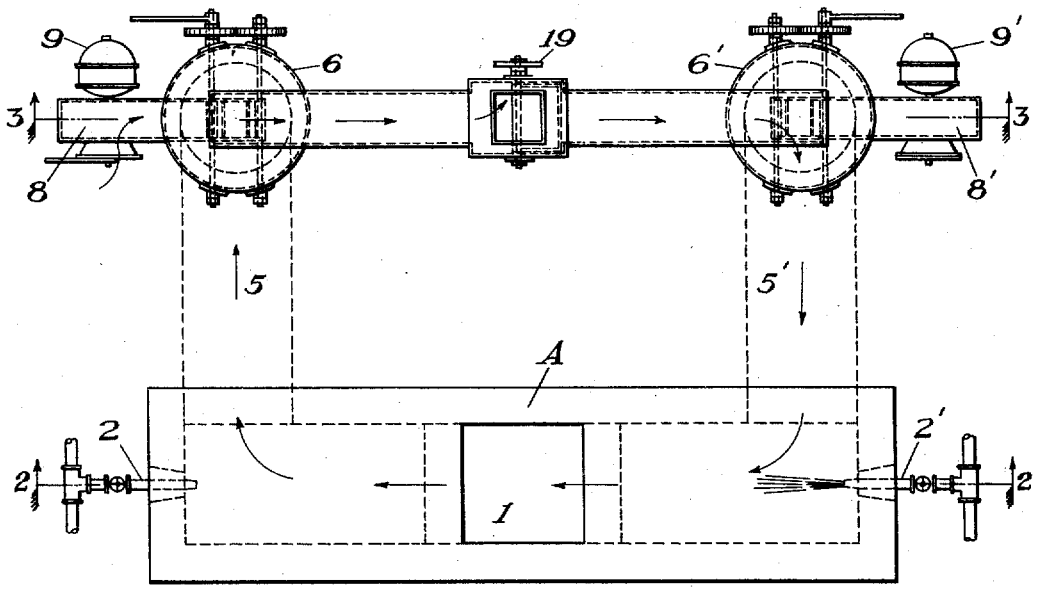
Fig. 1 is a plan view, partly diagrammatic, illustrating the application of my invention to a regenerative heating furnace of a conventional type.
Figure 2:
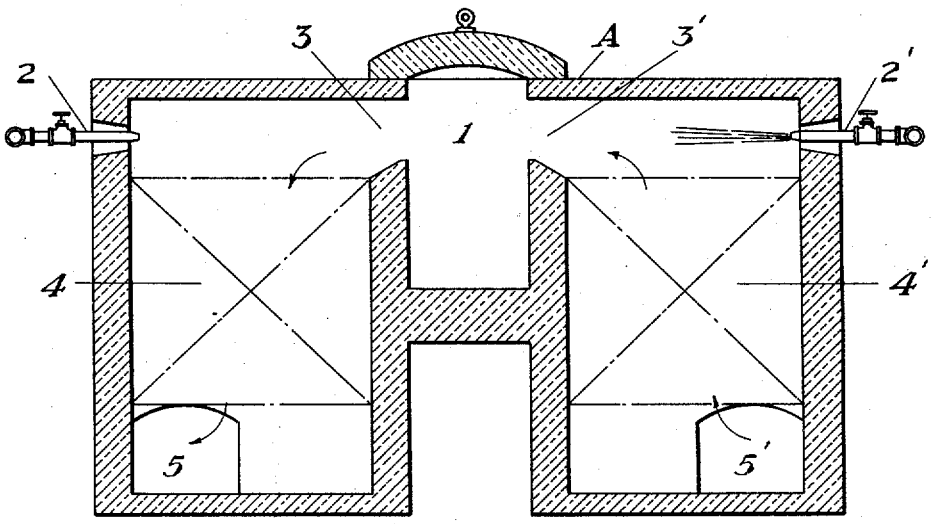
Fig. 2 is a sectional view on the line 2—2 of Fig. 1.

Referring first to Figs. 1 and 2, I have shown the invention as applied to a regenerative furnace A of conventional type, providing a heating chamber 1 and adapted for the use of oil, coke oven gas, tar, powdered coal, or the like, as fuel,—this involving the employment of suitable alternately operated burners 2 and 2′ at opposite ends of the furnace. The usual ports or passages 3 and 3′, which enter the chamber 1 from opposite sides, are in communication with regenerator or checker chambers 4 and 4′, respectively. From these chambers 4 and 4′, suitable flues 5 and 5′, respectively, lead to Venturi tubes or ducts 6 and 6′ of the general type shown and described in Isley's United States Letters Patent No. 1,635,939, dated July 12, 1927, and in Isley's United States Letters Patent No. 1,762,299, dated June 10, 1930. Within the ducts 6 and 6′, in proper relation to the Venturi throats thereof as shown in Fig. 3, are the upwardly directed nozzles 7 and 7′, respectively, these nozzles being supplied with air by exteriorly located blowing devices 8 and 8′, respectively, each driven by any suitable means, such as the electric motors 9 and 9′, Fig. 1.

Figure 3:
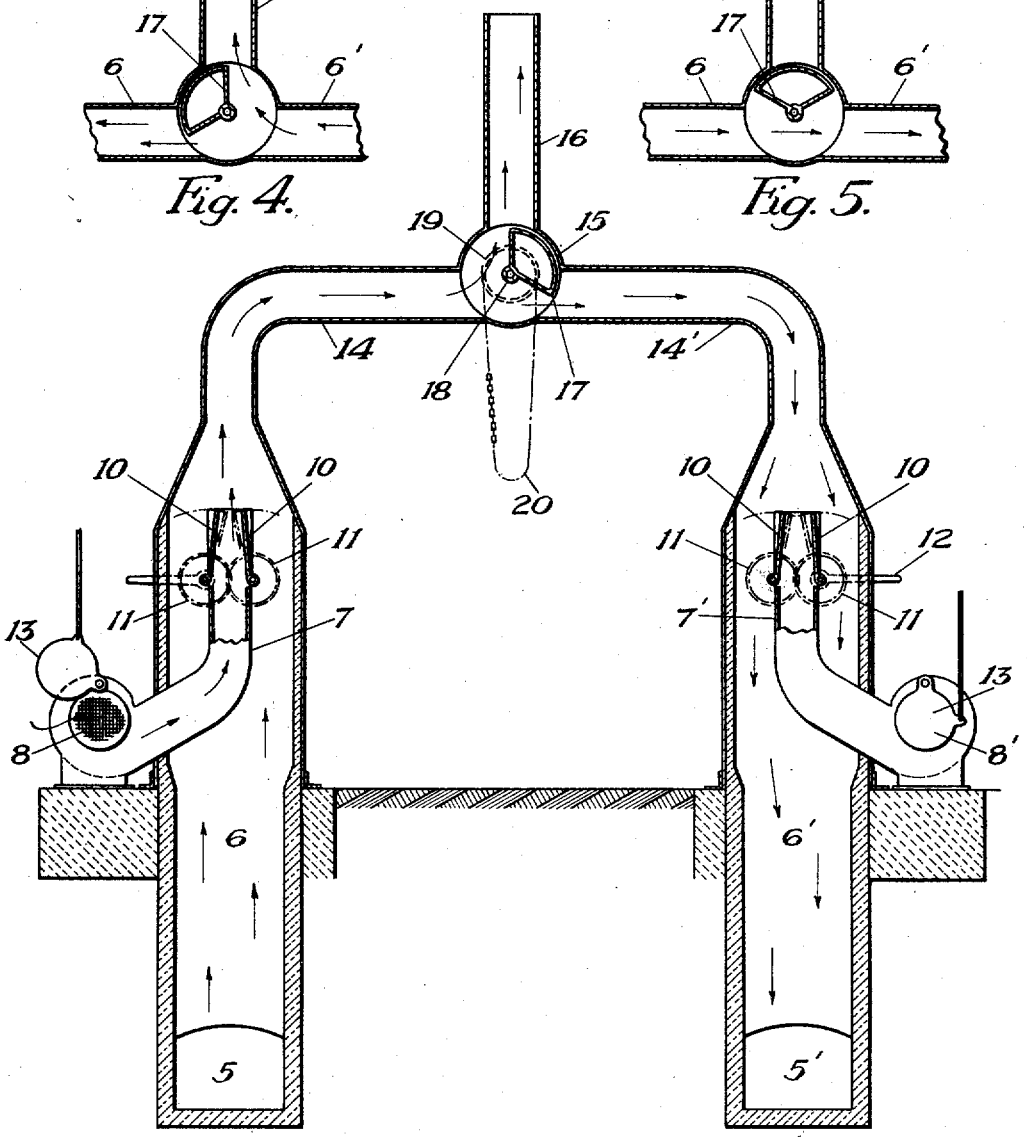
Fig. 3 is a sectional view on the line 3—3 of Fig. 1.

As best shown in Fig. 3, the effective discharge areas of the nozzles 7 and 7′ are preferably made adjustable, as for example, by the employment of pivoted wings 10, 10, which may be caused to approach each other, for the contraction of the nozzle area, or to recede from each other, for the expansion of the nozzle area, by any suitable adjusting means, such as the intermeshing gear segments 11, 11, secured to the pivoted spindles of said wings and movable angularly by the rocking of an arm 12, also secured to one of said pivoted spindles. Any other means, well known in the art, may be employed for increasing or decreasing the effective discharge area of these nozzles 7 and 7′. As also shown in Fig. 3, the volume of air supplied to each nozzle by its associated blower 8 or 8′ can be regulated at will in any suitable manner, as by the use of a pivoted plate 13, associated with the blower inlet, and adapted for positioning, at the will of an operator, either to wholly close, or to partially or fully open, said inlet. If desired, of course, said plate 13 may be applied instead to the blower outlet in each case.

It is to be understood that my invention is not in any sense limited to the drafting of the furnace by means of the blower-equipped ducts 6 and 6′; such ducts are here included only for illustrative purposes, since any other well known type of drafting means may be employed. For convenience, I have shown the ducts with their throats 14, 14′ meeting in a casing or enlargement 15, from which project upwardly a discharge tube 16; however, said ducts could just as well discharge individually to the atmosphere,—the only requisite being that intercommunication be provided, in some way, between ingoing and outgoing regenerators. In said casing 15 is disposed a valve 17, adapted to be moved by its spindle 18 into a variety of different positions, to control the intercommunication between the regenerators and the exhaust of the outgoing gases to the atmosphere. To this end, the spindle 18 is provided with suitable operating means for turning the valve 17, said means being here shown as a wheel 19 mounted on the spindle 18 and carrying a chain 20, by which it may be turned.

In the operation of the apparatus, when the gaseous flow through the furnace is from right to left, as indicated by the arrows in Figs. 1 and 2, the right hand burner 2′ is rendered operative, and the left hand burner 2 is rendered inoperative; under these conditions, the entrainment and discharge of the waste furnace gases is secured by operation of the left hand blowing device 8 to produce an upwardly-directed jet of air in the throat 14. This air, at high velocity, produces the necessary entraining action on the products of combustion to draw them out of the furnace by way of regenerator passage 4 and flue 5. Said combustion products, in admixture with the air so discharged by the left hand nozzle 7, pass upwardly through the duct 6, and at the juncture of said duct 6 with the duct 6′, the valve member 17 is so adjusted, as shown in Fig. 3, as to divide the outgoing mixed current, a portion of which discharges to the atmosphere through the outlet pipe or tube 16, while the balance is admitted to the duct 6′ to pass downwardly therethrough, and thence through the regenerator passage 5′ to the furnace, for the support of combustion therein. In other words, a portion of the air that is supplied under pressure on the outgoing side of the furnace, to cause expulsion of waste furnace gases, is afterwards used on the ingoing side of the furnace, to support combustion therein, said air in this process having been diluted by the waste gases themselves, so that the desired recirculation of the latter, to produce a lower temperature in the heating chamber is obtained. The volume of the diluted mixture can be varied at will by shifting the position of the valve member 17, and it will be obvious that under certain conditions, the intake 13 of the blowing device 8′ on the ingoing side, instead of being shut off entirely, as shown in Fig. 3, may be opened slightly, to admit some air, if the proportion of air in the mixture, as diverted to the ingoing duct 6′, is insufficient for the support of combustion of the fuel supplied by burner 2′.

Figure 4:
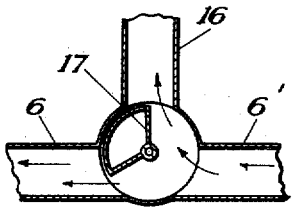
Figs. 4 and 5 are fragmentary detail views, illustrating different positions of a valve device used with the invention.
Figure 5:
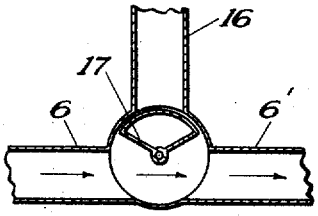

To reverse the furnace, the burner 2 is rendered operative, and the burner 2′ inoperative, and simultaneously the operating conditions of the blowing devices 8 and 8′ are reversed, and the valve 17 is shifted through approximately ninety degrees to stand in a dividing relation to the outgoing current in duct 6′, as shown in Fig. 4. Under these conditions, the gaseous flow through the furnace is from left to right, or in the opposite direction in every case from the arrows appearing on Figs. 1, 2 and 3. If desired, the valve 17 may be moved into the intermediate position illustrated in Fig. 5, where it shuts off entirely the discharge pipe or tube 16, and in this position the effect, of course, is to hold the heat in the furnace regardless of the direction of the circulation. Said valve 17 provides a means by which recirculation of the waste furnace gases may be obtained, or not obtained, as desired, as well as a means by which the amount of waste gases so recirculated may be very closely regulated and controlled.

Figure 6:
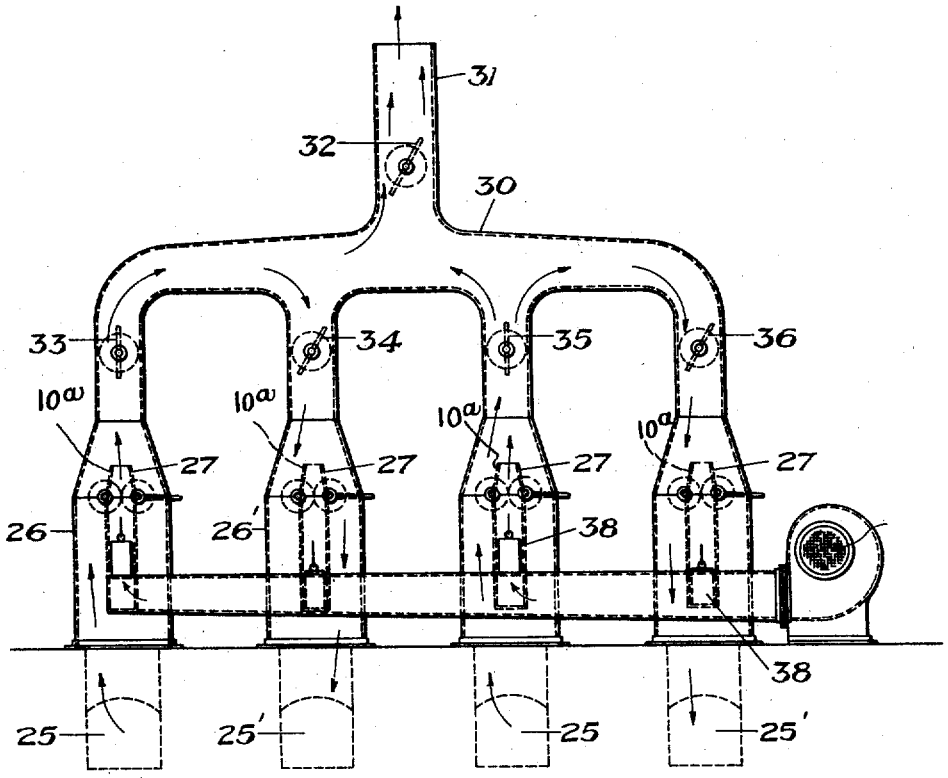
Figs. 6 and 7 are, respectively, views in side elevation and in plan, showing the application of the invention to a pair of adjacent heating furnaces or soaking pits.
Figure 7:
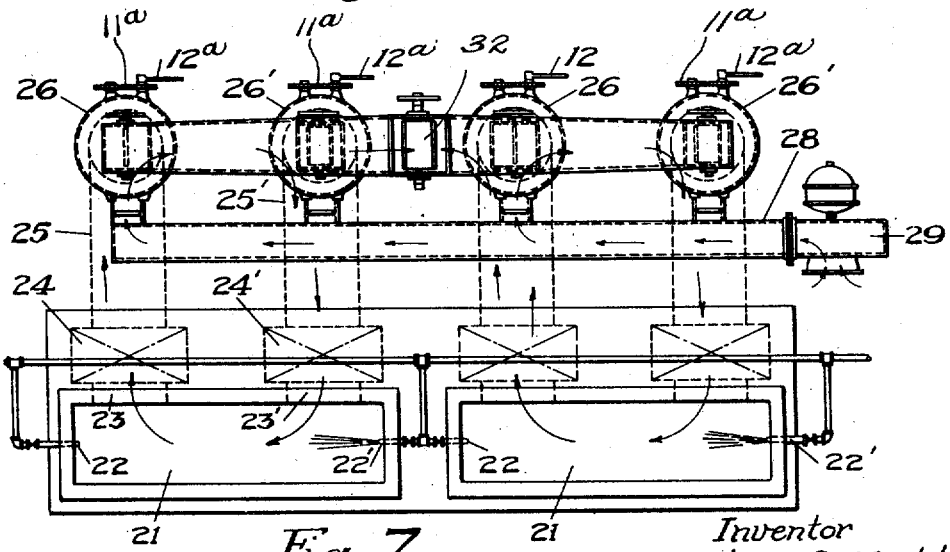

Figs. 6 and 7 illustrate an adaptation of my invention to a pair of alined furnaces 21, 21, each equipped at opposite ends with suitable fuel burners 22 and 22′. Each furnace 21 has associated therewith the ports 23 and 23′ that communicate respectively with regenerator or checker chambers 24 and 24′. From these chambers, suitable flues 25 and 25′ respectively lead to Venturi tubes or ducts 26 and 26′,—there being four of the latter, or two for each furnace. Within each of these Venturi ducts, in proper relation to the throat thereof, is disposed an upwardly directed nozzle 27,—the four nozzles being here shown as connected to a common air supply pipe 28 which is fed by any suitable blowing device 29.

The several Venturi ducts 26, 26 and 26′, 26′ are connected at their upper ends to a common tube or duct 30, providing a single upwardly directed outlet 31, wherein is disposed a suitable adjustable damper 32. Each of the Venturi throats is also provided with an adjustable damper,—the two dampers for the left hand furnace being numbered 33 and 34 and the two dampers for the right hand furnace being numbered 35 and 36. Each of the four air nozzles 27, 27 is equipped, the same as the nozzles 7 and 7′ of Fig. 3, with pivoted wings 10*a*, 10*a*, which may be caused to approach each other, for the contraction of the nozzle area, or to recede from each other, for the expansion of the nozzle area, by any suitable adjusting means, such as the intermeshing gear segments 11*a*, 11*a*, secured to the pivoted spindles of said wings and movable angularly by the rocking of an attached arm 12*a*. Also, the volume of air supplied to each nozzle 27 by the supply pipe 28 can be regulated at will in any suitable manner, as by the use of a slidable plate or damper 38, associated with the inlet of each nozzle, and adjustable in height to vary, as shown in Fig. 6, said inlet opening.

In the operation of the above described apparatus, when the gaseous flow through each furnace 21 is from right to left, as indicated by the arrows in Fig. 7, each right hand burner 22′ is maintained operative, and each left hand burner 22 is maintained inoperative; under these conditions, as shown in Fig. 6, the nozzle dampers 38, 38 of the two ducts 26′, 26′ are closed, while the nozzle dampers 38, 38 of the two ducts 26, 26 are open. In this way, in each of the outgoing ducts 26, 26 is obtained the discharge of an air jet of sufficient volume and velocity to entrain through said ducts the waste furnace gases from the left hand end of each furnace, and the mixture of air and waste gases thus formed passes freely into the tube or duct 30 by reason of the dampers 33 and 35 being in a substantially open position, as shown in Fig. 6. To secure the recirculation of a portion of this mixture through the furnaces, the outlet of the same through the discharge pipe 31 is suitably throttled by adjustment of the latter's damper 32, and the other duct dampers 34 and 36 are left partially open, whereby a portion of the mixture will be drawn downwardly into the Venturi ducts 26′, 26′, for passage in an ingoing direction to the right hand end of each furnace. In this way is obtained the desired dilution of the air admitted to each furnace for the support of combustion therein; the volume of the diluted mixture can be varied at will by manipulation of the dampers 32, 34 and 36, and if more air is needed in the mixture, the same can be secured by slightly opening the nozzle dampers 38, 38 of the Venturi ducts 26′, 26′ and by adjusting the associated nozzles 27, 27 so that said air will be discharged into said ducts without appreciable velocity.

To reverse the travel of gases through the furnaces 21, 21, the dampers 34 and 36 are moved into full open position, and the dampers 33 and 35 are partially closed. At the same time, the burners 22, 22 are rendered operative and the burners 22′ 22′ inoperative, and also the sliding dampers 38, 38 of the ducts 26, 26 are closed, while the corresponding dampers of the two ducts 26′, 26′ are opened. Thereupon, each duct 26′, 26′ becomes an outlet duct and each duct 26, 26 becomes an inlet duct, so that the gaseous flow through each furnace is from left to right, or in the opposite direction from the arrows appearing on Figs. 6 and 7.

It is to be understood that the invention is not limited in any way to the specific arrangements of Figs. 6 and 7, where all the ducts 26 and 26′ are in communication with the outlet pipe 31; if desired, the several ducts 26 and 26′ may have independent outlets, since it is possible to obtain the recirculation above described by means of branch passages between the ducts that establish the same intercommunication as the common tube or duct 30. With such an arrangement, each individual outlet would be equipped with its own adjustable damper, corresponding to the damper 32 of Fig. 6.

I claim,

1. In the operation of a heating furnace. the improvement which consists in entraining the waste furnace gases by a blast of air on the outgoing side of the furnace, and using a portion only of the resulting mixture of air and waste gases on the ingoing side of the furnace to support combustion therein.

2. In the operation of a heating furnace, the improvement which consists in blowing air outwardly through the exit passages of a furnace to entrain and discharge the waste furnace gases, and diverting to the intake passages of said furnace a portion only of the resulting mixture of air and waste gases, for supporting the combustion of the fuel used in said furnace.

3. In the operation of a heating furnace, the improvement which consists in drafting the furnace by an outwardly-directed air jet adapted for the entrainment and discharge of the waste furnace gases, and recirculating a portion only of the resulting mixture of air and waste gases through the furnace for the support of combustion therein.

4. In the operation of a heating furnace, the improvement which consists in blowing air outwardly through an exit passage of the furnace, to entrain the waste furnace gases and discharge them from said passage, dividing the outgoing mixed current of air and waste gases thus formed, and recirculating a portion only of said mixture through the furnace by way of the latter's intake passage, thereby to procure the support of combustion within the furnace by means of a diluted air supply.

5. In a waste gas recirculating system for a heating furnace, means for blowing air outwardly through a furnace exit passage to entrain the waste furnace gases, and means for deflecting a portion only of the resulting mixed current of air and waste gases to the ingoing side of the furnace, for supporting the combustion of the fuel used in said furnace.

6. In a waste gas recirculating system for a heating furnace, means for blowing air outwardly through a furnace exit passage, to entrain the waste furnace gases, means for deflecting a portion of the mixed current thus formed of air and waste gases to the ingoing side of the furnace, for supporting the combustion of the fuel used in said furnace, and means for preliminarily heating said ingoing mixture of air and waste gases.

7. In a heating furnace, a recirculating system for waste furnace gases, comprising an air blast for the entrainment and expulsion of said gases, and means for diverting a portion only of the resulting mixed current of air and waste gases to the intake of said furnace, for supporting combustion of the fuel used therein.

8. In a regenerative heating furnace, the combination with opposite regenerator passages adapted for use alternately as the outtake for waste gases and the intake for combustion-supporting air, of means operable in each passage when used as the furnace outtake for producing a blast of air to entrain and discharge the waste furnace gases, and means common to both passages for dividing, in predetermined proportions, the mixed current of air and waste gases thus formed, and for diverting to the other intake passage one portion of said current, for admission to the furnace to support combustion of the fuel used therein.

9. In the operation of a heating furnace, the improvement which consists in entraining the waste furnace gases by a blast of air on the outgoing side of the furnace, introducing a portion of said air, thus diluted with waste gases, to the furnace for the support of combustion therein, and preliminarily heating on the way to the furnace the air and waste gases so introduced.

10. In the operation of a heating furnace, the improvement which consists in entraining the waste furnace gases by a blast of air on the outgoing side of the furnace, dividing the resulting mixed current of air and waste gases, exhausting one portion of said mixed current to the atmosphere, and admitting another portion of said mixed current to the furnace for the support of combustion therein.

11. In the operation of a heating furnace, the improvement which consists in drafting the furnace by an outwardly-directed air jet, adapted for the entrainment and discharge of the waste furnace gases, recirculating a portion of the mixed current of air and waste gases thus formed through the furnace, for the support of combustion therein, and preliminarily heating said portion on its way to the furnace.

12. In the operation of a heating furnace, the improvement which consists in drafting the furnace by an outwardly-directed air jet for the entrainment of the waste furnace gases, regulating the discharge from said jet to produce a mixed outgoing current containing predetermined proportions of air and waste gases, and recirculating a portion only of said mixed current through the furnace, thereby to procure the support of combustion within the same by means of a diluted air supply.

13. In the operation of a heating furnace, the improvement which consists in drafting the furnace by an outwardly-directed air jet, adapted for the entrainment of waste furnace gases, and diverting a predetermined portion only of the resulting mixed current of air and waste gases into the furnace, on the intake side thereof, to support combustion of the fuel used in said furnace.

14. In the operation of a heating furnace, the improvement which consists in drafting the furnace by an outwardly-directed air jet for the entrainment of the waste furnace gases, regulating the discharge of air from said jet to produce a mixed outgoing current containing predetermined proportions of air and waste gases, and diverting a predetermined portion only of the mixed current of air and waste gases thus formed into the furnace, on the intake side thereof, to support the combustion of the fuel used in said furnace.

15. In a heating furnace, a recirculating system for waste furnace gases, comprising an air blast for the entrainment and expulsion of said gases, means for regulating said air blast to produce an outgoing current containing air and waste gases in predetermined proportions, and means for diverting a predetermined portion only of said mixed outgoing current to the intake of said furnace, for the support of combustion therein.

16. In a heating furnace, a recirculating system for waste furnace gases, comprising an air blast for the entrainment of said gases, a passage opening to the atmosphere for the expulsion of the resulting mixed current of air and waste gases, and valve means associated with said passage for diverting therefrom a portion of said mixed current for admission to the furnace to support combustion therein.

17. In a heating furnace, a recirculating system for waste furnace gases, comprising an air blast for the entrainment of said gases, two passages, one opening to the atmosphere and the other to the intake of said furnace, for receiving the resulting mixed current of air and waste gases, and a valve device cooperating with said passages to divide said current, in predetermined proportions between them.

18. In a regenerative heating furnace, the combination with opposite regenerator passages serving alternately, as the furnace is reversed, for waste gas outtake and air intake, of an air blast in each passage for the entrainment and discharge of waste gases, means for regulating each air blast to produce an outgoing mixed current containing predetermined proportions of air and waste gases, a discharge to the atmosphere from both passages, and adjustable means for dividing, in predetermined proportions, the outgoing mixed current from one passage between said discharge and said other passage.

19. In a regenerative heating furnace, the combination with a pair of regenerator chambers serving alternately, as the furnace is reversed, for waste gas exit and air intake, of a connection between said chambers, and means for procuring, by flow of air under pressure, the aspiration through said connection of waste gases from said exit chamber in admixture with said air, for delivery to the furnace through said intake chamber.

20. A waste gas recirculating system for a regenerative heating furnace, comprising, in combination with the furnace regenerators serving alternately as intake and exit passages, a means for supplying combustion-supporting air under pressure, and means for aspirating by said air the flow, in admixture with said air, of waste furnace gases from said exit regenerator into said intake regenerator.

21. A heating furnace having means for preheating the air employed to support combustion therein, means for supplying such air under pressure, and means for aspirating by such air the flow, in admixture with said air, of waste furnace gases into said preheating means.

22. In a regenerative heating furnace, the combination with opposite regenerator passages serving alternately, as the furnace is reversed, for the off-take of waste gases and for the intake of combustion-supporting air, of a connection between said passages at their outer ends, and means for effecting, by the flow of combustion-supporting air under pressure, the aspiration of waste gases in admixture with said air through said connection, for delivery to the furnace through the regenerator passage then serving as the furnace intake.

GUSTAV A. MERKT.